Figure 1:
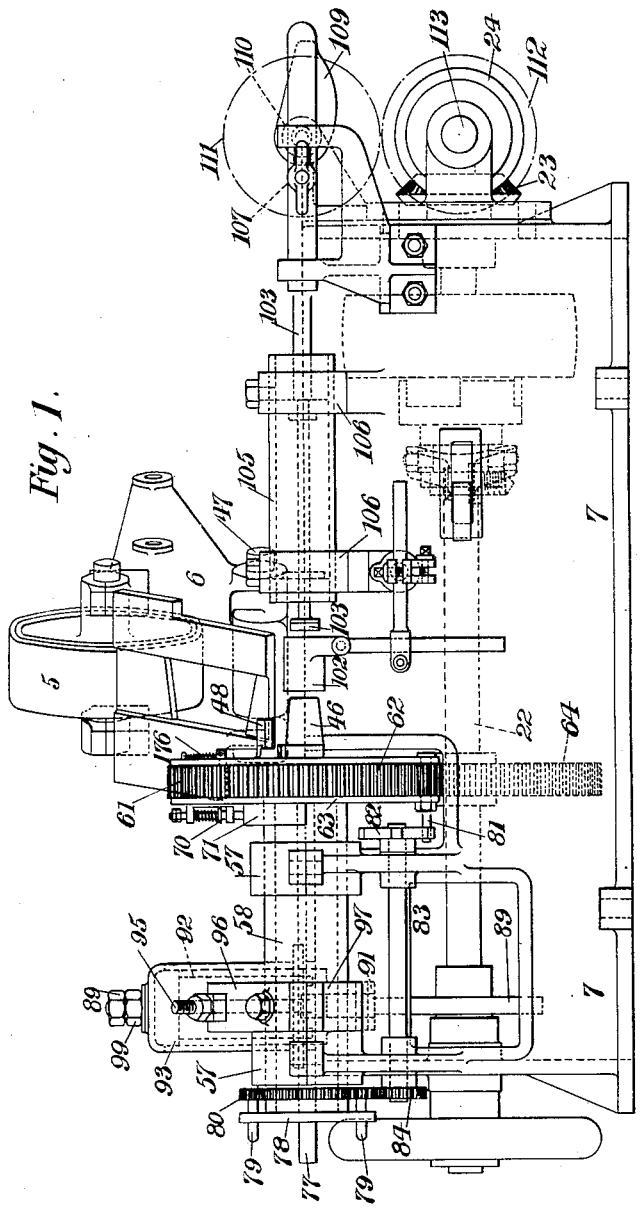

F. A. G. ROBIN.
MACHINE FOR WRAPPING AND NESTING HOLLOW ARTICLES.
APPLICATION FILED JUNE 19, 1908.

945,730.

Patented Jan. 4, 1910.

7 SHEETS—SHEET 1.

WITNESSES
L. H. Grote
Charles C. Abbe

INVENTOR
Frederick Alexander Garibaldi Robin
BY
Howson and Howson
ATTORNEYS

F. A. G. ROBIN.
MACHINE FOR WRAPPING AND NESTING HOLLOW ARTICLES.
APPLICATION FILED JUNE 19, 1908.

945,730.

Patented Jan. 4, 1910.
7 SHEETS—SHEET 2.

WITNESSES

INVENTOR
Frederick Alexander Garibaldi Robin
BY

ATTORNEYS

F. A. G. ROBIN.
MACHINE FOR WRAPPING AND NESTING HOLLOW ARTICLES.
APPLICATION FILED JUNE 19, 1908.

945,730.

Patented Jan. 4, 1910.
7 SHEETS—SHEET 3.

WITNESSES

INVENTOR
Frederich Alexander Garibaldi Robin
BY

Howson and Howson
ATTORNEYS

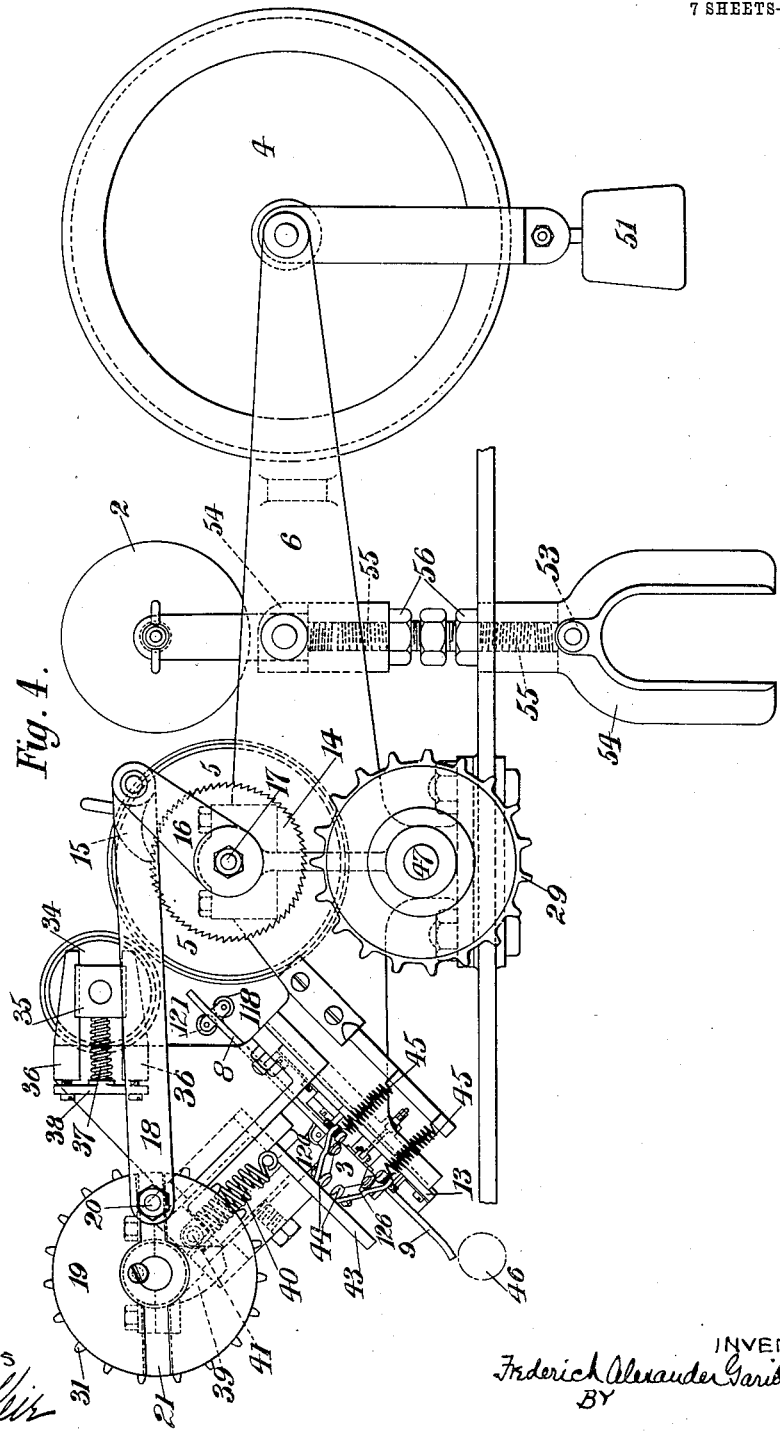

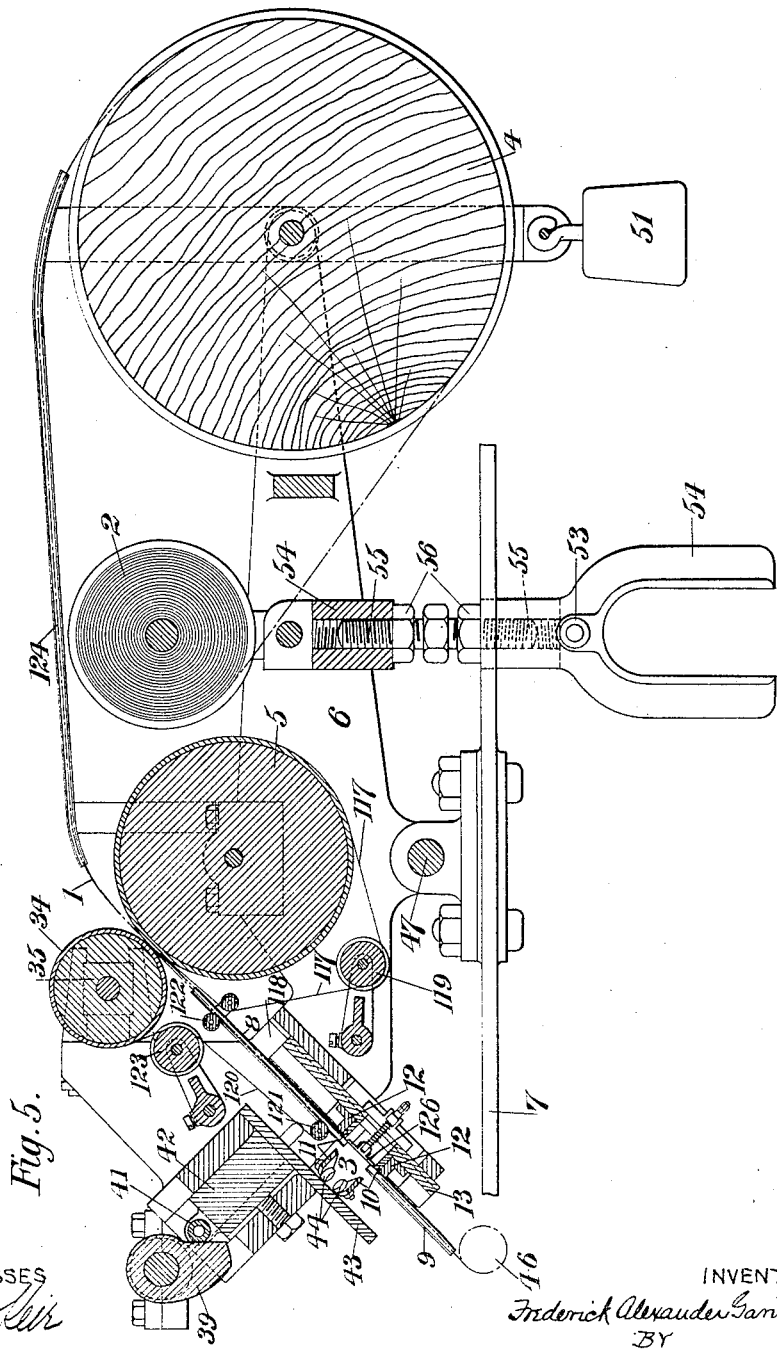

F. A. G. ROBIN.
MACHINE FOR WRAPPING AND NESTING HOLLOW ARTICLES.
APPLICATION FILED JUNE 19, 1908.
945,730.
Patented Jan. 4, 1910.
7 SHEETS—SHEET 6.
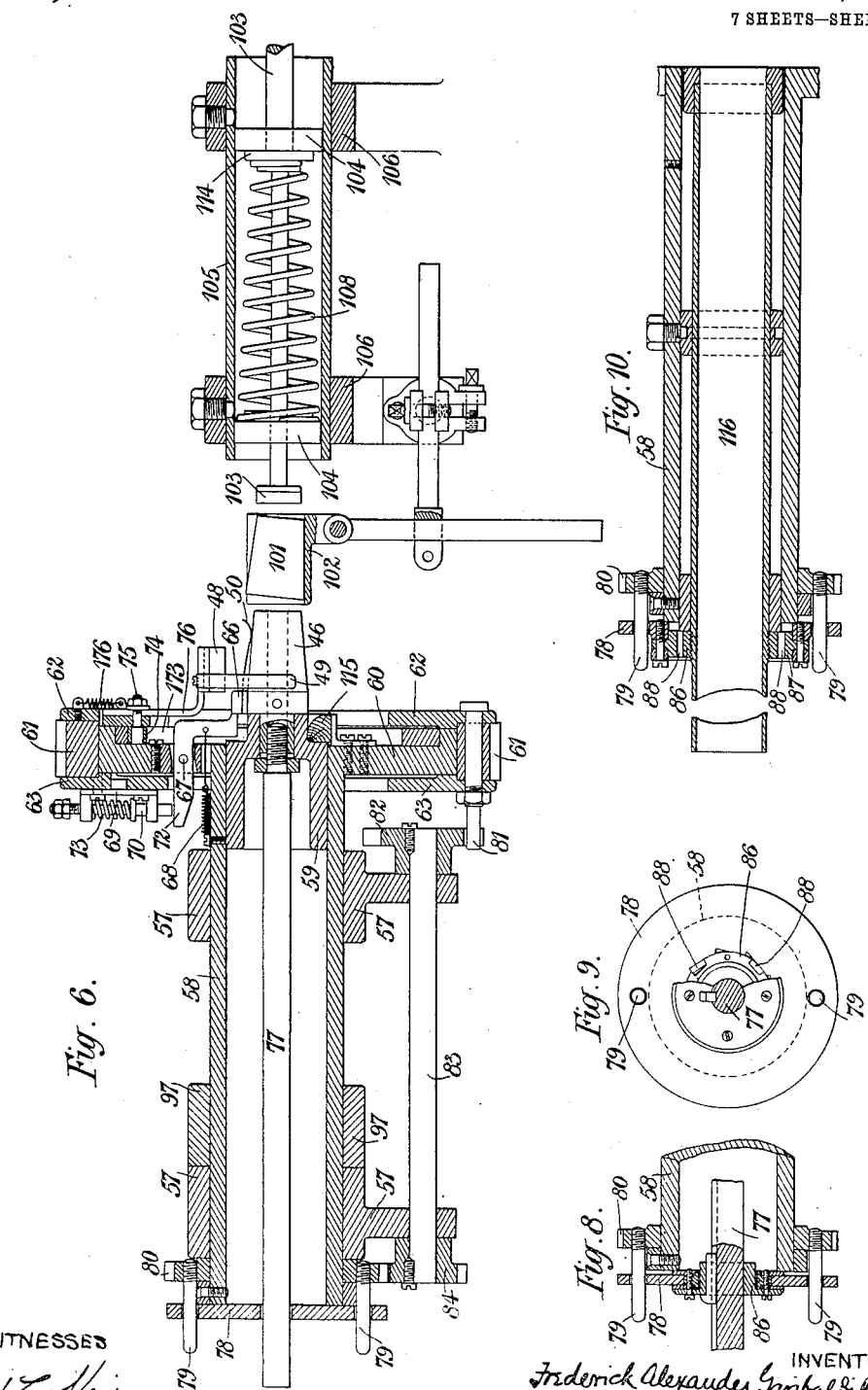
WITNESSES
INVENTOR
Frederick Alexander Garibaldi Robin
BY
ATTORNEYS

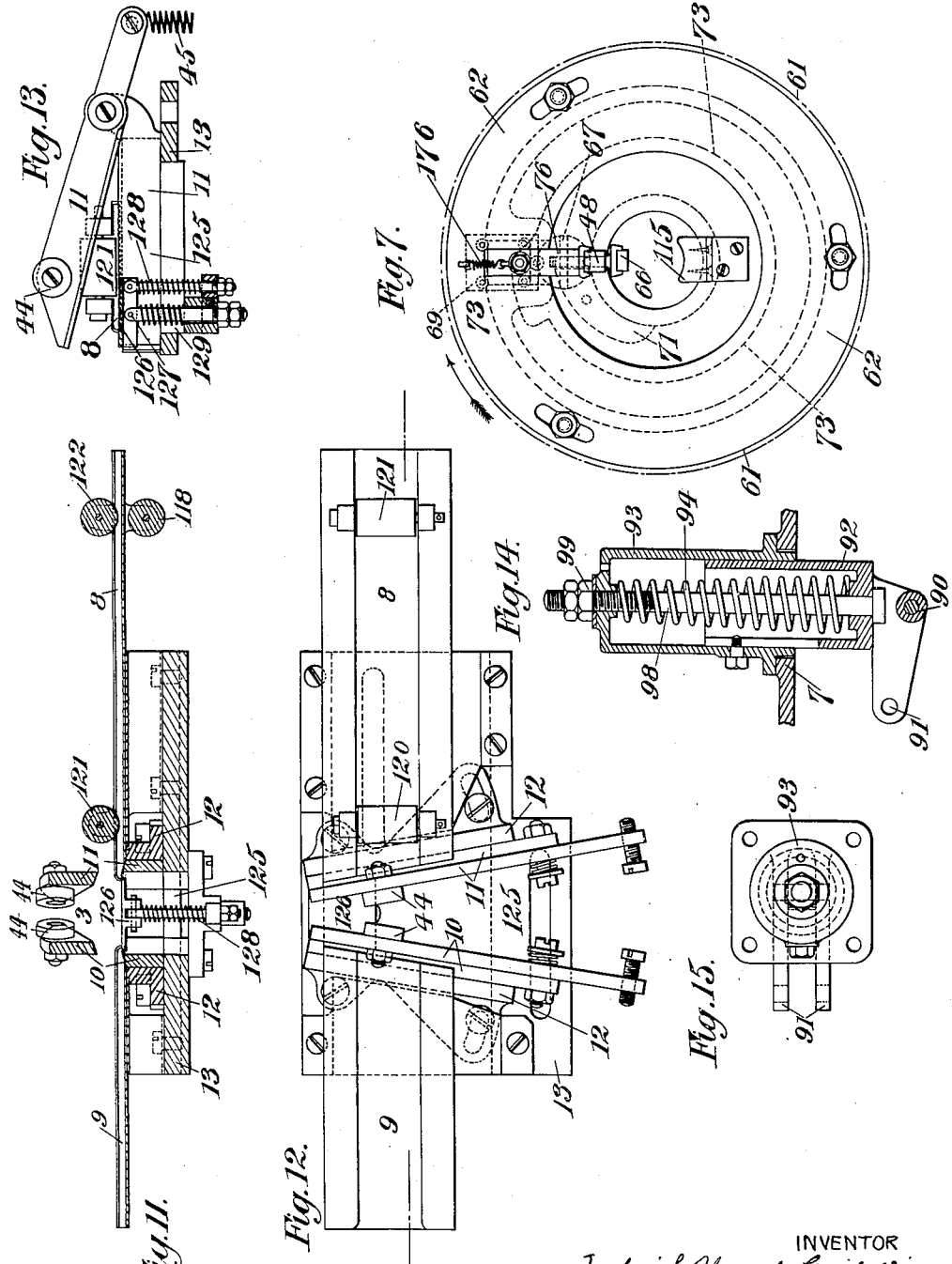

UNITED STATES PATENT OFFICE.

FREDERICK ALEXANDER GARIBALDI ROBIN, OF BAYSWATER, LONDON, ENGLAND.

MACHINE FOR WRAPPING AND NESTING HOLLOW ARTICLES.

945,730.            Specification of Letters Patent.      Patented Jan. 4, 1910.

Application filed June 19, 1908. Serial No. 439,429.

*To all whom it may concern:*

Be it known that I, FREDERICK ALEXANDER GARIBALDI ROBIN, a subject of the King of Great Britain and Ireland, of 48 Pembridge Villas, Bayswater, in the county of London, England, engineer, have invented a new and useful Machine for Wrapping and Nesting Hollow Articles, of which the following is a specification.

My invention has for its object to provide apparatus by means of which hollow articles can be wrapped with paper, or equivalent material, and packed one within the other, instead of performing these operations by hand.

The said apparatus consists of a combination of means for feeding a strip of paper, or equivalent material, from a roll thereof, a cutting device by which pieces of suitable length and shape are cut from the said strip, and means whereby the said pieces are wrapped around the articles and means whereby the articles, as they are wrapped, are packed successively on each other so that the wrapping and packing is effected in a more efficient, expeditious, and economical manner than can be done by hand.

The apparatus can be constructed to wrap and pack various hollow, or partially hollow, articles which are of a shape such that they can, when wrapped, be passed onto one another, but it is more especially intended for wrapping metallic capsules which have had coloring matter applied thereto, the sticky nature of the pigments usually employed being liable to cause adhesion when the capsules are packed over each other, unless a protective material, such as oiled, or waxed, paper, or the like, is placed between them.

I will describe, with reference to the accompanying drawings, a construction of apparatus in accordance with this invention as applied to the wrapping with paper and packing over each other of colored capsules, from which its general application will also be understood, premising that I do not limit myself to the precise details and arrangements hereinafter described and shown in the accompanying drawings, as they may be varied considerably without departing from the nature of my invention.

Figure 2:
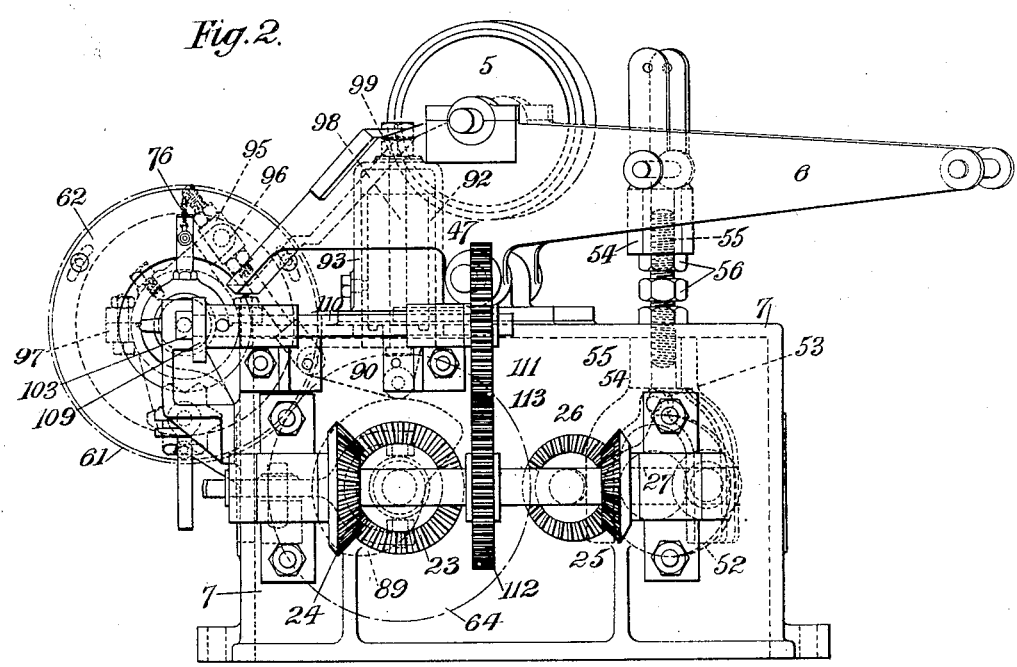
Figure 3:
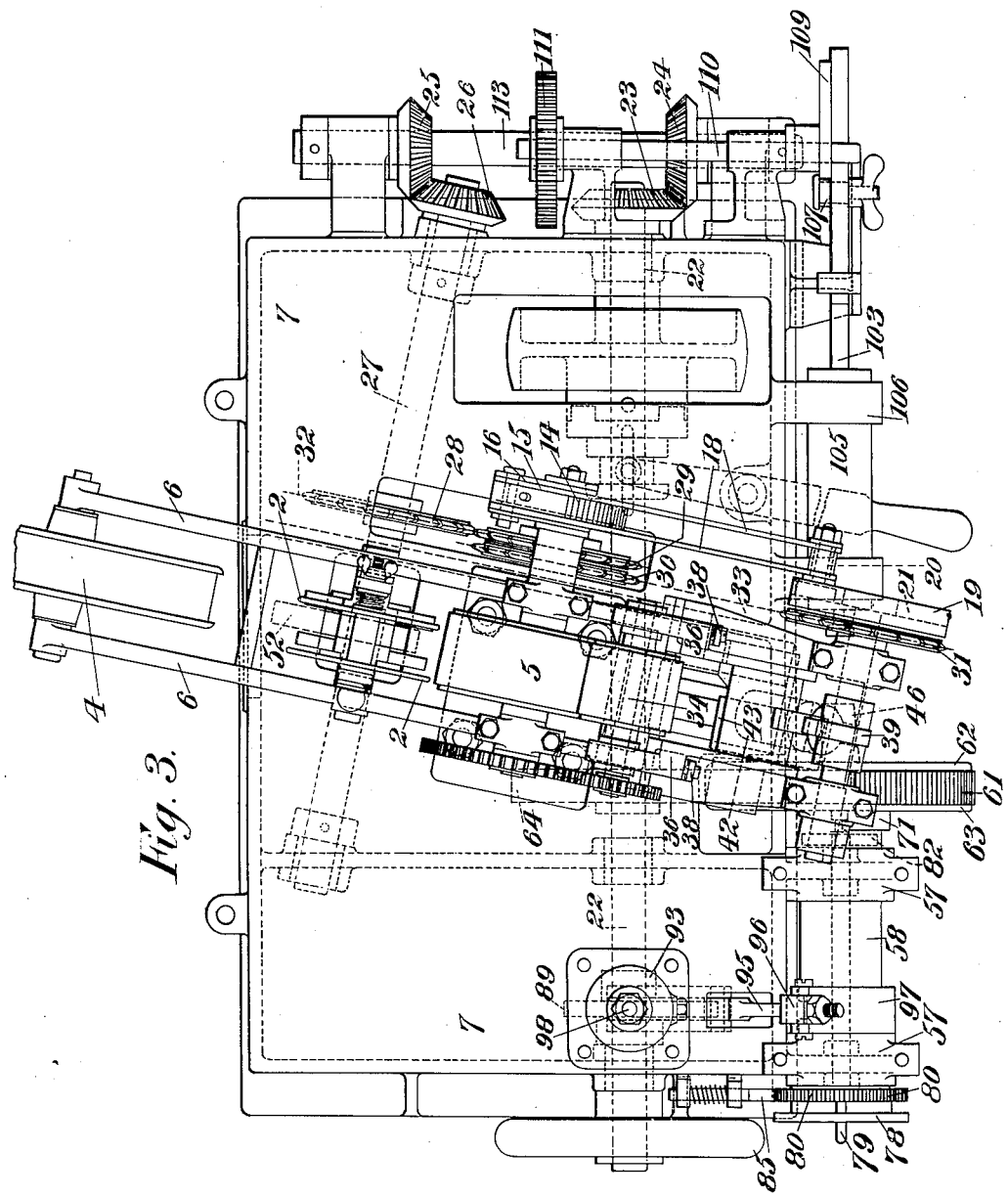

Figures 1 and 2 are front and side elevations respectively, with parts carried by the tilting frame removed, of an apparatus in accordance with my invention, and Fig. 3 is a plan of the entire apparatus. Figs. 4 and 5 are side and sectional elevations respectively, drawn to a larger scale, of the tilting frame and accessories carried thereby. Fig. 6 is a sectional elevation, drawn to a larger scale, of the cylindrical bearing piece, spur ring, and mechanism for feeding the hollow article to be wrapped onto the mandrel, and Fig. 7 is a face view of the enlarged circumferential part of the said cylindrical bearing piece carrying the spur ring, side disks, wiper and presser finger, or catch. Fig. 8 is a sectional elevation, and Fig. 9 an end view, of the rear end of the cylindrical bearing piece, showing mechanism for preventing the rotation in a reverse direction of the mandrel. Fig. 10 is a sectional elevation of a modified arrangement in which the mandrel shown in Fig. 6 is dispensed with. Fig. 11 is a longitudinal section, Fig. 12 a plan, and Fig. 13 a transverse section, of the cutting device and guides. Fig. 14 is a vertical section, and Fig. 15 a plan, showing means for effecting the amount of partial rotation imparted to the cylindrical bearing piece.

The paper 1 is led from a roll 2 and is guided and controlled in its passage to a cutting device 3 for example by being passed around a guide roller 4, or guide rollers, and over a feeding drum 5 mounted on a tilting frame 6 carried by the main frame 7 of the machine and secured thereto at an angle to suit the cone of articles to be wrapped, and the paper is then passed between guides 8 and 9 secured to the forward end of the said tilting frame 6 and between the said cutting device 3 consisting of two cutters 10 and 11, preferably each made so as to act like shears, situated between the opposed ends of the said guides 8 and 9 and also carried by the said tilting frame 6 at angles adapted to cut the ends of the paper at the angles required by the conical shape of the articles to be wrapped and packed. The said cutters can, if required, be arranged so that they can be adjusted for altering both the angle of the cuts and the lengths of paper cut. They may for this purpose be mounted on a bracket 12 adjustably mounted on a plate 13 capable of sliding in a guide in, or on, the forward end of the tilting frame 6. The paper 1 is led from the aforesaid feeding drum 5 to and through the rearward guide 8, and between the blades of the cutting device 3, and thence to and through the forward guide 9, from which the said paper 1 projects.

The paper 1 is fed forward intermittently by the feeding drum 5 which is caused to be intermittently partially rotated by any suitable means. For example, the feeding drum 5 may have secured thereto a ratchet wheel 14 with which a pawl 15 engages, the said pawl 15 being carried by an arm 16 pivoted to the shaft 17 carrying the feeding drum 5. To the said arm 16 is attached one end of a connecting rod 18, the other end of the said rod 18 being adjustably connected to a disk, wheel, or pulley, 19 by means of a crank pin 20 adjustably secured to a slot 21 in the said disk, wheel, or pulley. The said disk, wheel, or pulley, 19 is situated at, and carried by, the forward end of the tilting frame 6 and rotary motion is imparted to the said wheel 19 from the main driven shaft 22 of the machine through bevel transmission gears 23, 24, 25, 26, to a shaft 27, sprocket-wheels 28 and 29, 30 and 31, and chains 32, 33. The rotation of the disk, wheel, or pulley, 19 causes the arm 16 carrying the pawl 15 to oscillate on its fulcrum, and the angular movement of the said arm 16 may be varied by moving the aforesaid crank pin 20 nearer to, or farther from, the center of the disk, wheel, or pulley, 19, thus altering the length of paper fed forward. The paper 1 may be held in frictional contact with the feeding drum 5 by means of a roller, or drum, 34 mounted in bearings 35, free to slide between brackets 36 secured to the tilting frame 6, springs 37, in compression, being interposed between the bearings 35 and a cross bar, or yoke, 38, or other relatively fixed part.

The paper having been fed forward and a portion thereof protruding from the forward guide 9, the feed of the said paper is temporarily stopped, and the mechanism for operating the cutting device 3 comes into action for cutting the paper. The said mechanism for effecting the cutting of the paper consists of a cam 39 secured to the shaft carrying the aforesaid disk, wheel, or pulley, 19, which cam 39, in opposition to springs 40 and through an antifriction roller 41, causes the stem 42 of a plate 43 to be moved downward, the under surface of the said plate 43 then pressing upon the upper blades through antifriction rollers 44 carried by the upper and movable blades of the cutters, so as to cause the said upper blades to close upon the lower and fixed blades which are held in position on the tilting frame 6, and so the paper is cut to the required angles and length. The upper blades of the knives, or shears, are returned to their open position by springs 45 when the aforesaid plate 43 rises.

The paper having now been cut to the required angle and length is ready to be wrapped around a capsule placed on a mandrel 46 in a position to be wrapped, and this is effected as follows: The tilting frame 6 is caused to be tilted on its fulcrum 47 until the protruding end of the piece of paper 1 in the forward guide 9 on the said tilting frame is laid onto the capsule on the mandrel 46, whereupon a presser finger, or catch, or presser fingers, or catches, 66 is, or are, caused to be actuated and grips, or holds, or grip, or hold, the said portion of paper 1 to the said capsule. The tilting frame then returns to its normal position and the paper is drawn out of the forward guide 9. A wiper, such as a brush, or roller, 48, or brushes, or rollers, or the combination of both, is, or are, then brought into contact with the paper 1 and revolved around the capsule so as to sweep, or roll, the said paper around the capsule. Blade, or wire, springs, such as 49 and 50, may be employed to assist in retaining the paper on the capsule until a succeeding capsule is pushed on the preceding wrapped capsule, and so retain the paper thereon. The means by which the before-mentioned operations may be effected are hereinafter separately described.

The tilting frame may be caused to be tilted on its fulcrum 47 at the requisite moment in opposition to springs, or a weight, 51 by a cam 52 secured to the countershaft 27, the said cam acting preferably through the intervention of an antifriction roller 53 upon the lower end of a vertical, or approximately vertical, arm 54, the upper end of which is connected to the said tilting frame 6. Provision is made for varying the tilt of the said tilting frame by adjusting the length of the said arm 54, which can conveniently be done by making the said arm in two parts and connecting the parts by a right- and left-handed screw 55 and nuts 56.

The aforesaid mandrel 46 is carried on the main frame of the apparatus at a lower horizontal plane than the guide 9 on the tilting frame 6. Mounted in bearings 57 on the main frame 7 of the apparatus is a cylindrical bearing piece 58 constituting a bearing for an enlarged part 59 in connection with the said mandrel 46, and through which bearing piece eventually passes the part 59 with the mandrel 46 connected thereto with the wrapped capsules thereon, as hereinafter described. The said cylindrical bearing piece 58 has, at its inner end, an enlarged circumferential part 60 which has rotatably mounted thereon a spur ring 61 secured in position thereon by side disks 62 and 63 bolted to the said spur ring 61, continuous rotary motion being imparted thereto by a spur wheel 64 secured to the driving shaft 22 of the machine. To the side disk 63, bolted to the continuously rotating spur ring 61, is attached the mechanism for raising the presser finger, or catch, 66 from off the paper on the capsule, while another piece of paper on a succeeding capsule is being placed beneath it, and to the side disk 62, bolted to the other side of the said spur ring 61, is attached the aforesaid wiper, brush, or roller, 48 for sweeping, or rolling, the paper around the capsules.

The presser finger, or catch, 66 is pivotally connected at 67 to the normally stationary enlarged circumferential part 60 of the cylindrical bearing piece 58 in connection with the capsule mandrel, a spring 68, connected at one end to the presser finger, or catch, 66, and at the other end to the said cylindrical bearing-piece 58, insuring a sufficient hold, or grip, of the paper on the mandrel 46. The presser, finger, or catch, 66 is caused to release its grip, or hold, upon the paper wrapped around the capsule in the following manner:—The disk, or flange, 63 bolted to, and rotating with, the aforesaid spur ring 61, carries a bracket 69 provided with bearings in which slides an inwardly spring-pressed pin 70, which is pressed outwardly while rotating by engaging with an inclined surface, or cam, 71 on the normally stationary cylindrical bearing piece 58 of the mandrel 46. The said inclined surface, or cam, 71 ends in close proximity to the tail 72 of the presser finger, or catch, 66, so that upon the further rotation of the spur ring 61, the outward pressure on the said pin 70 ceases, and the said pin is pressed inwardly by its spring 73 (which is stronger than the spring 68 acting on the presser finger 66, as aforesaid), and causes the pin 70 to press down the tail end 72 of the presser finger, or catch, 66 so that the paper is freed from the grip, or hold, of the said presser finger, or catch. The said presser finger, or catch, 66 is held out of contact with the mandrel 46 by the aforesaid spring-pressed pin 70 sufficiently long to permit of the succeeding piece of paper coming beneath it.

As hereinbefore stated, the wiper brush, or roller, 48 is connected to the side disk 62 bolted to one side of the continuously rotating spur ring 61 by any suitable means, provided the wiper, brush, or roller, rotates therewith. The arrangement illustrated in Figs. 6 and 7 consists of a cam-groove 173 formed in the enlarged circumferential part 60 of the cylindrical bearing piece 58 of the mandrel, which causes the said wiper, brush, or roller, 48 to come into contact with the paper by reason of an antifriction roller 74 on the inner end of a pin 75 on the arm 76 carrying the wiper, brush, or roller, 48 engaging the said cam-groove 173. A spring 176 attached at one end to the side disk 62, and attached at its other end to the said pin 75 on the arm 76 of the wiper, brush, or roller, 48, insures the antifriction roller 74 bearing on the side of the cam groove 173 and consequently the wiper, brush, or roller, 48 is withdrawn from contact with the paper when the said antifriction roller reaches the highest part of the said cam groove 173.

If each succeeding cut-off piece of paper 1 to be wrapped around a capsule on the mandrel 46 be brought to, and laid on, the said mandrel at precisely the same place as that preceding it, there would be a liability of the paper being turned up, or otherwise damaged, by contact with the edge of the paper wrapped on the preceding capsule, so that the presser-finger, or catch, 66, when released by the spring-pressed pin 70, might fail to effectually grip and hold the succeeding paper. To overcome this objection, the mandrel 46 is caused to partially rotate in one direction, and the cylindrical bearing piece 58, carrying the presser-finger, or catch, 66 on its enlarged circumferential part 60, is caused to partially rotate in the opposite direction so as to separate, in a tangential direction, the exposed obstructing edge of paper on the wrapped capsule from the presser-finger, or catch, 66, so that, when the succeeding piece of paper is laid on its capsule, it is free from the obstruction of the preceding paper and can be held firmly to the said capsule when the presser-finger, or catch, 66 is freed by the aforesaid spring-pressed pin 70.

The mandrel 46 may be caused to partially rotate by the following means:—Connected to the said mandrel 46 is a rod 77 of a square, or other non-circular, section, and of a sufficient length to project through the hollow cylindrical bearing piece 58. A disk 78 with a correspondingly shaped hole formed therein, through which the said rod 77 is free to slide, but not rotate, is carried, on the projecting end of the said rod 77, the said disk 78 having other holes formed therein near its outer circumference into which enter projections 79 on a spur-wheel 80 rotatably mounted on the hollow cylindrical bearing piece 58. On the outer side of the spur ring 61, on the enlarged circumferential part 60 of the cylindrical bearing piece 58 of the mandrel, is secured a stud, or projection, 81 which, as the said spur ring 61 rotates, engages with, and disengages from, a star wheel 82 secured on a shaft 83 and causes, once in every revolution of the said spur ring 61, the star wheel 82 to partially rotate, which partial rotation is transmitted to the spur wheel 80 by means of the spur pinion 84 secured on the shaft 83 of the star wheel 82, and consequently the mandrel 46 is partially rotated by means of the aforesaid spur wheel 80, the projections 79 thereon causing the partial rotation of the disk 78 on the end of the mandrel rod 77. Convenient means may be employed to prevent any tendency of the mandrel rod 77 to rotate in the reverse direction, such, for instance, as shown in Fig. 3, wherein a spring-controlled pawl 85 mounted on the frame 7 of the machine engages with the teeth of the spur wheel 80 and prevents the rotation thereof in one direction, but permits the said wheel to rotate in the other direction by the teeth thereof acting on the inclined part of the said spring-controlled pawl 85, which causes the said pawl to be forced back against the action of the spring. Figs. 8 and 9 illustrate another arrangement for effecting this object wherein a free wheel clutch is employed, one member 86 of which is secured to the mandrel rod 77 and the other member may be secured to the disk 78, or, as shown in these figures, the disk 78 may constitute the second member, suitable spring-controlled balls, rollers, or the like, 88 being interposed between the members which engage with suitable recesses formed in one member and cause the members to become locked when rotated in one direction, but allow of the members running free when rotated in the opposite direction, as is usual in this type of clutch mechanism.

The before mentioned partial rotation of the cylindrical bearing piece 58 is effected by the following means: The main driving shaft 22 has secured thereto a cam 89 (see Figs. 1 and 2) which, through an antifriction roller 90, carried by arms 91 integral with the lower end of a plunger 92 (see Figs. 14 and 15) forces the said plunger 92 in a cylinder 93 secured to the top frame of the machine in opposition to a spring 94 contained therein. The said plunger 92 is, by the arms 91 and a link 95, pivotally connected to an arm 96 connected to, or forming part of, a clamping device 97 around the said cylindrical bearing piece 58, so that when the plunger 92 is actuated by the said cam 89, the movement is imparted by the link 95 to the arm 96 which causes the cylindrical bearing piece 58 to partially rotate. The amount of partial rotation imparted to the cylindrical bearing piece 58 may be adjusted by a rod 98 connected at one end to the plunger 92, the other end, which is screw-threaded, passing through a hole in the end of the cylinder 93. The protruding screw-threaded end of the said rod 98 is provided with a nut 99 which, upon being turned in one direction, or the other, causes the rod 98 and the plunger 92 connected thereto to be raised, or lowered, in the cylinder 93. By this means the position of the antifriction roller 90 in respect to the cam 89 can be adjusted so that the said cam engages the said roller 90 at an earlier, or later, period, and consequently the cylindrical bearing piece 58 is caused to be oscillated through an arc of a greater, or lesser, degree.

The means employed for placing the capsules on the mandrel 46 and on each other is as follows:—The capsules 101 (see Fig. 6) are introduced into an open-ended receptacle 102 adjustably connected to the main frame 7 of the apparatus. In close proximity to the said receptacle 102 is a ram, or pusher, 103 capable of sliding in supports 104 secured in a carrier 105 fixed in brackets 106 on the main frame 7 of the apparatus. The said ram, or pusher, 103, through an antifriction roller 107 (see Figs. 1 and 3), is forced in a forward direction in opposition to a spring 108 by a cam 109 secured on a shaft 110 on which is fixed a spur wheel 111, the said spur wheel 111 receiving rotary motion from a spur wheel 112 secured on the shaft 113 carrying the bevel wheels 24 and 25 already referred to. The said ram, or pusher, 103 is forced forward by the said cam 109 until it has pushed, or forced forward, the capsule 101 from the receptacle 102 onto the mandrel 46, or onto a preceding capsule, the said ram, or pusher, 103 being returned to its normal position by the spring 108 bearing at one end on a collar 114 fixed on the said ram, or pusher, 103, and at the other end on the fixed support 104. By the time the capsule 101 has been wrapped with paper, as hereinbefore described, another capsule has been inserted in the receptacle 102 and this capsule is pushed forward over the preceding wrapped capsule on the next rotation of the cam 109. With this and each succeeding capsule placed over the one preceding it, the mandrel 46 and packed capsules thereon are gradually forced within the cylindrical bearing piece 58, until eventually the packed capsules on the mandrel constitute the mandrel for the succeeding ones, which then bear on a suitable support 115 secured in position on the enlarged circumferential part 60 of the cylindrical bearing piece 58.

The mandrel 46 and mandrel rod 77 may be dispensed with, as shown in Fig. 10, and in substitution therefor is provided a tube 116 through which the wrapped capsules are intermittently pushed by the aforesaid ram, or pusher, 103. By this means the wrapping and packing of the capsules may be performed continuously, whereas, in the device shown in Fig. 6, when the rear part of the mandrel 46 has reached the disk 78, the said disk, and the mandrel 46, together with the wrapped and packed length of capsules thereon, must be taken off the apparatus in order to take away the said wrapped capsules; subsequently the mandrel is replaced, or another substituted, and the disk 78 placed in position and the wrapping and packing may be again proceeded with. In the arrangement shown in this Fig. 10 when the apparatus commences to wrap and pack capsules, a temporary mandrel is employed, which, as the wrapping and packing proceeds, is gradually pushed along the said tube 116 until it reaches the outer end thereof, when it may be taken away, the already wrapped and packed capsules in the tube 116 then constituting the mandrel for the succeeding capsules. The partial rotation of the cylindrical bearing piece 58 is performed in a manner as shown and described with reference to Fig. 6, and the partial rotation in a direction opposite thereto of the tube 116 may be performed in a manner analogous to that shown and described with reference to Figs. 8 and 9, the weight of the said capsules in the tube affording sufficient friction on the said tube for the capsules to rotate therewith.

It is found advantageous, when thin flexible paper is employed for wrapping, to lead the paper through suitable stationary guides and guide rollers and to provide the guide rollers with endless bands by means of which the thin flexible paper is assisted in being fed toward the mandrel. In Fig. 5 such an arrangement of stationary guides and rollers provided with endless bands is shown. According to this arrangement an endless band 117 is passed over the feeding drum 5 and a roller 118 situated near the under rear end of the guide 8 already referred to, a jockey pulley 119 keeping the said band 117 taut. Another endless band 120 is led from the before mentioned roller, or drum, 34 beneath a roller 121 situated at the upper forward end of the said guide 8 from whence it passes beneath a second roller 122 at the upper rear end of the guide 8 to the said drum 34, a jockey pulley 123 keeping the said endless band 120 taut. The paper is led from the roll 2 around the guide roller 4 and through an upper stationary guide 124 from whence it is led between the endless bands 117 and 120 and is thereby fed and guided to and through the rearward guide 8, from whence it passes to the mandrel 46 through the forward guide 9. In order to guide the flexible paper over a gap 125 (see Figs. 11, 12 and 13) through which the angularly cut piece of waste paper falls, between the blades 10 and 11 of the cutting device 3, a yieldable bridge 126 is provided, upon which one side edge of the paper bears and guides the course of the paper to the forward guide 9. The yieldable bridge 126 is mounted on a pivot 127 so that when the upper blades of the cutting device 3 are caused to descend, they first bear upon the inner edge of the said table causing it to slightly tilt in opposition to a spring 128 which causes the cut piece of paper to be deflected into the aforesaid gap 125. The further descent of the upper blades forces the table 126 vertically, or approximately vertically, downward in opposition to the combined springs 128 and 129.

The capsules, or other hollow, or partially hollow, articles to be wrapped, instead of being placed in a receptacle 102, as hereinbefore described and shown in the accompanying drawings, may be caused to be brought into position to be pushed onto the mandrel 46 by the ram, or pusher, 103 in any other convenient manner, for instance, they may be placed on an endless traveling band, or wheel, provided with suitable receptacles, or devices, for receiving, or holding, the said capsules, or other hollow, or partially hollow, articles.

A recording, or counting, device may be mounted in proximity to the mandrel, or the capsules constituting the mandrel, so that, as a capsule is placed on the mandrel by the ram, or pusher, the said recording, or counting, device will be caused to be operated and indicate the number of capsules wrapped and packed.

In the following claims where I refer to a mandrel I include in that expression either a mandrel such as that shown in Fig. 6 or a mandrel constituted by a wrapped series of the hollow articles themselves.

Having now particularly described and ascertained the nature of my said invention and in what manner the same is to be performed, I declare that what I claim is:—

1. In a machine for wrapping hollow articles, a carrier to support the articles wrapped, said articles being nested one upon another and forming a mandrel, together with means for wrapping an article nested on said mandrel.

2. In a machine for wrapping hollow articles, a rotary carrier through which the wrapped and nested articles pass, a rotary wrapping device concentric therewith, and means for rotating said carrier and wrapping device simultaneously in opposite directions to wrap an article nested on the article last wrapped, substantially as described.

3. In a machine for wrapping hollow articles, a rotary carrier through which the wrapped and nested articles pass, a rotary wrapping device mounted thereon and means for rotating said carrier and wrapping device simultaneously in opposite directions to wrap an article nested on the article last wrapped, substantially as described.

4. In a machine for wrapping hollow articles, a carrier through which the wrapped and nested articles pass, a rotary wrapping device concentric therewith, and means for rotating said carrier and wrapping device simultaneously in opposite directions to wrap an article nested on the article last wrapped, in combination with means for intermittently feeding wrapping material to the said mechanism, substantially as described.

5. In a machine for wrapping hollow articles, a carrier through which the wrapped and nested articles pass, a rotary wrapping device concentric therewith, and means for rotating said carrier and wrapping device simultaneously in opposite directions to wrap an article nested on the article last wrapped, in combination with means for intermittently cutting and feeding wrapping material to the said mechanism, substantially as described.

6. In an apparatus for wrapping round hollow articles and packing them one within the other, a tilting frame provided with means for intermittently feeding a required length of wrapping material to position to be cut, a suitable cutting device, means for operating the same and means for tilting the said frame to bring the cut piece of wrapping material into position to be wrapped around the hollow article, substantially as described.

7. In an apparatus for wrapping round hollow articles, the combination of a cylindrical bearing piece carrying, and slidable therein, a mandrel adapted to receive the initial wrapped hollow article, a spring-controlled presser finger for holding the wrapping material on the hollow article on the said mandrel, and means for releasing the hold of the said presser finger on the said wrapping material, a continuously rotating spur ring carrying a wiper for sweeping the said wrapping material around the said hollow article, and means for bringing the said wiper into and out of contact with the said wrapping material, substantially as described.

8. In an apparatus for wrapping round hollow articles, a cylindrical bearing piece and a mandrel carrying the wrapped articles and working within the same, means for intermittently partially rotating said bearing piece and mandrel in opposite directions, substantially as and for the purpose described.

9. In a machine for wrapping hollow articles, a receptacle, open at the ends into which the hollow articles to be wrapped are placed, a pusher acting upon said articles to advance them through said receptacle and means for reciprocating said pusher, a mandrel onto which the said articles are pushed and nested by the said reciprocating pusher, a carrier through which the wrapped and nested articles pass, and means for wrapping material around the hollow article on the mandrel.

10. In a machine for wrapping hollow articles, a receptacle, open at the ends into which the hollow articles to be wrapped are placed, a pusher acting upon said articles to advance them through said receptacle and means for reciprocating said pusher, a mandrel onto which the said articles are pushed thereby, a carrier through which the wrapped and nested articles pass, a rotary wrapping device for wrapping material around the hollow article on the mandrel and means for intermittently feeding wrapping material to the said wrapping mechanism, substantially as described.

11. In a machine for wrapping hollow articles, a receptacle open at the ends into which the hollow articles to be wrapped are placed, a pusher acting upon said articles to advance them through said receptacle and means for reciprocating said pusher, a mandrel onto which the said articles are pushed and nested by the said reciprocating pusher, a carrier through which the wrapped and nested articles pass, a rotary wrapping device for wrapping material around the hollow articles, means for intermittently feeding wrapping material to the said mechanism, in combination with means for cutting said wrapping material, substantially as described.

12. In an apparatus for wrapping round hollow articles, the combination of a cylindrical bearing piece carrying a mandrel slidable therein to receive the wrapped and nested articles, a spring-controlled presser-finger for holding the wrapping material on the hollow article on the said mandrel, and means for releasing the hold of the said presser-finger on the said wrapping material, a continuously rotating spur ring carrying a wiper for sweeping the said wrapping material around the said hollow article, and means for bringing the said wiper into and out of contact with the said wrapping material, substantially as described.

13. In an apparatus for wrapping round hollow articles, a cylindrical bearing piece and a mandrel carrying the wrapped articles and working within the same, means for intermittently partially rotating the mandrel and means for rocking the said bearing piece, substantially as and for the purpose described.

In testimony whereof I have signed my name to this specification in the presence of two subscribing witnesses.

FREDERICK ALEXANDER GARIBALDI ROBIN.

Witnesses:
GILBERT FLETCHER TYSON,
WILLIAM GERALD REYNOLDS.